United States Patent
Mu et al.

(10) Patent No.: US 9,612,465 B2
(45) Date of Patent: Apr. 4, 2017

(54) SOURCE DRIVING CIRCUIT AND LCD DEVICE

(71) Applicant: Infovision Optoelectronics (Kunshan) Co., Ltd., KunShan, JiangSu Province (CN)

(72) Inventors: Yuanyuan Mu, KunShan (CN); Dalei Zhang, KunShan (CN); Xiaoning Gao, KunShan (CN); Fei Jiang, KunShan (CN)

(73) Assignee: INFOVISION OPTOELECTRONICS (KUNSHAN) CO., LTD., Kunshan, Jiangsu Province (CN)

( * ) Notice: Subject to any disclaimer, the term of this patent is extended or adjusted under 35 U.S.C. 154(b) by 2 days.

(21) Appl. No.: 14/659,599

(22) Filed: Mar. 16, 2015

(65) Prior Publication Data

US 2016/0104446 A1 Apr. 14, 2016

(30) Foreign Application Priority Data

Oct. 14, 2014 (CN) .......................... 2014 1 0542451

(51) Int. Cl.
   *G09G 3/36* (2006.01)
   *G02F 1/133* (2006.01)
(52) U.S. Cl.
   CPC ....... *G02F 1/13306* (2013.01); *G09G 3/3688* (2013.01); *G09G 3/3614* (2013.01); *G09G 2310/027* (2013.01); *G09G 2310/0291* (2013.01); *G09G 2310/08* (2013.01)

(58) Field of Classification Search
   None
   See application file for complete search history.

(56) References Cited

U.S. PATENT DOCUMENTS

2005/0212742 A1* 9/2005 Nishitani ............. G09G 3/3614
                                                                 345/92
2007/0046614 A1 3/2007 Chien

FOREIGN PATENT DOCUMENTS

| CN | 1674081 A | 9/2005 |
|---|---|---|
| CN | 1870116 A | 11/2006 |
| CN | 102456310 A | 5/2012 |
| CN | 103996366 A | 8/2014 |

* cited by examiner

*Primary Examiner* — Seokyun Moon
(74) *Attorney, Agent, or Firm* — Cheng-Ju Chiang

(57) ABSTRACT

The present invention provides a source driving circuit and an LCD device. The source driving circuit includes output channels, and each output channel includes a first switch element, a second switch element, a first output end, and a second output end. The first switch element and the second switch element are respectively connected to the first output end and the second output end. When the first switch element is turned on, the output channel outputs a display signal, and when the second switch element is turned on, the output channel provides recycled charges which are generated when the display signal is changed from a positive voltage to a negative voltage. The source driving circuit can recycle charges to make the most of charges generated when the display signals change from positive voltages to negative voltages and reduce power consumption of the LCD device.

12 Claims, 7 Drawing Sheets

SOURCE DRIVING CIRCUIT AND LCD DEVICE

CROSS-REFERENCE TO RELATED APPLICATION

This application claims priority from Chinese Patent Application No. 201410542451.8 filed on Oct. 14, 2014. The contents of the above-mentioned patent application is hereby incorporated by reference herein in its entirety and made a part of this specification.

FIELD OF THE INVENTION

The present invention relates to the field of liquid crystal display (LCD) technology, and more particularly to a source driving circuit and an LCD device using the source driving circuit.

BACKGROUND OF THE INVENTION

The LCD device has been widely used in various electric devices such as TV, personal computer, tablet personal computer, PDA, phone, digital camera, and so on, due to characteristics of thin thickness, low power consumption and low radiation etc. The LCD device usually includes a gate driving circuit, a source driving circuit, a plurality of scanning lines, a plurality of data lines, and a plurality of pixels formed by intersection of the plurality of scanning lines and the plurality of data lines. The plurality of scanning lines is connected to the gate driving circuit. The gate driving circuit is used to provide gate driving signals to the plurality of pixels through the plurality of scanning lines. The plurality of data lines is connected to the source driving circuit. The source driving circuit is used to provide display signals to the plurality of the pixels through the plurality of the data lines.

At present, the LCD device usually use the polarity inversion driving manner which means that a positive polarity and a negative polarity of voltages of the display signals provided to every pixel by the source driving circuit alternately change. For example, in a frame time, the polarity of the voltage of the display signal provided to a pixel by the source driving circuit is positive, and in next frame time, the polarity of the voltage of the display signal provided to the pixel by the source driving circuit is negative. The polarity inversion driving manner includes frame inversion, row inversion, column inversion and dot inversion. Please referring to FIG. 1, FIG. 1 is a schematic view of voltage polarity of the dot inversion. FIG. 1 shows 4 row*4 column pixels, as shown in FIG. 1, the dot inversion means that the polarities of the voltages of the display signals provided to every two adjacent pixels are different in every frame time, and in a next frame time, the polarity of the voltage of the display signal provided to each pixel is different from that in a former frame time.

It needs power consumption that the polarity of the voltage is changed from negative to positive. In the LCD device using the polarity inversion driving manner, the source driving circuit needs to change the polarities of display voltages once when every frame is refreshed, so it needs large power consumption. Especially in the LCD device using the dot inversion driving manner, the source driving circuit changes voltage polarities of the display signals provided by output channels corresponding to every data line once when every scanning line is scanned by the gate driving signal in every frame time, besides changing the polarities of the display voltages once when every frame is refreshed, so larger power consumption is needed. In order to reduce the power consumption, charge sharing technology is developed.

Please referring to FIG. 2, FIG. 2 is a schematic circuit diagram of a conventional source driving circuit. As shown in FIG. 2, the source driving circuit 10 includes a first output channel 11 and a second output channel 12. The first output channel 11 includes a first digital-to-analog converter 110, a first amplifier 112, and a first output 114. The second output channel 12 includes a second digital-to-analog converter 120, a second amplifier 122, and a second output 124. The first output channel 11 is used to provide a first output signal Output1, and the second output channel 12 is used to provide a second output signal Output2. The first output signal Output1 and the second output signal Output2 are respectively provided to adjacent two data lines of the LCD device (not shown) as display signals.

Please referring to FIG. 3, FIG. 3 is a schematic waveform diagram of the first output signal Output1 and the second output signal Output2 when the source driving circuit 10 is not using the charge sharing technology. Taking using the dot invention driving manner, a reference voltage being 4.7V, and a maximum display power consumption (such as a maximum negative voltage is 0.2V, a maximum positive voltage is 9.2V) for example, as shown in FIG. 3, voltage of the first output signal Output1 which is outputted by the first output 114 and voltage of the second output signal Output2 which is outputted by the second output 124 change between 0.2V and 9.2V at a row scanning frequency, that is, polarities of the voltages of the first output signal Output1 and the second output signal Output2 change once when a scanning line is scanned. As indicated by solid arrows, it needs power consumption that the first output signal Output1 and the second output signal Output2 change from 0.2V to 9.2V.

Please referring to FIG. 2 and FIG. 4, FIG. 4 is a schematic waveform diagram of the first output signal Output1 and the second output signal Output2 when the source driving circuit 10 uses the charge sharing technology. A switch 13 is added between the first output 114 of the first output channel 11 and the second output 124 of the second output channel 12. The switch 13 is controlled by a charge sharing control signal CSC. As shown in FIG. 4, after the source driving circuit 10 drives a load, that is, when every scanning line is scanned, after the source driving circuit 10 provides the display signals to corresponding pixels, the charge sharing control signal CSC controls the switch 13 turn on to make the first output 114 and the second output 124 share charges (as indicated by hollow arrows), for example, when the first output 114 provides the first output signal Output1 of 9.2V, and the second output 124 provides the second output signal Output2 of 0.2V, the voltages of the first output 114 and the second output 124 are changed to 4.7V after the first output 114 and second output 124 share charges. On this basis, when polarities of the voltages of the first output signal Output1 and the second output signal Output2 change in next time, for example, when the voltage of the first output signal Output1 needs to change to 0.2V and the voltage of the second output signal Output2 needs to change to 9.2V, because that the voltages of the first output 114 and the second output 124 are 4.7V owing to sharing the charges, the voltage of the first output 114 needs to continue to reduce from 4.7V to 0.2V, and the voltage of the second output 124 just need to increase from 4.7V to 9.2V, then the first output signal Output1 having the voltage of 0.2V and the second output signal Output2 having the voltage of 9.2V are provided. Therefore, when the polarity of voltage change, only increasing voltage from 4.7V to 9.2V consumes current.

It follows that, the power consumption of the source driving circuit 10 using the charge sharing technology is lower than that of the source driving circuit 10 not using the charge sharing technology. However, as shown in FIG. 4, even the charge sharing technology is used, charges generated when the voltage changes from 4.7V to 0.2V are underused when the first output signal Output1 and the second output signal Output2 changes from positive voltage to negative voltage, such as from the maximum positive voltage of 9.2V to the maximum negative voltage of 0.2V.

SUMMARY OF THE INVENTION

Therefore, the present invention provides a source driving circuit, so as to solve charge underused problem when the output signals provided by the source driving circuit change from positive voltage to negative voltage.

In accordance with an aspect, the present invention provides a source driving circuit, and the source driving circuit includes a plurality of output channels. Each output channel includes a first switch element, a second switch element, a first output end, and a second output end. The first switch element is connected to the first output end, and the second switch element is connected to the second output end. When the first switch element is turned on, the output channel outputs a display signal through the first switch element and the first output end, and when the second switch element is turned on, the output channel provides recycled charges through the second switch element and the second output end, and the recycled charges are generated when the display signal outputted by the first output end is changed from a positive voltage to a negative voltage.

In accordance with another aspect, the present invention further provides an LCD device, the LCD device includes a source driving circuit and a plurality of data lines. The source driving circuit includes a plurality of output channels, and the plurality of the output channels are respectively connected to the plurality of the data lines to provide display signals to the plurality of the data lines. Each output channel includes a first switch element, a second switch element, a first output end, and a second output end. The first switch element is connected to the first output end, and the second switch element is connected to the second output end. When the first switch element is turned on, the output channel outputs a display signal through the first switch element and the first output end, and when the second switch element is turned on, the output channel provides recycled charges through the second switch element and the second output end, and the recycled charges are generated when the display signal outputted by the first output end is changed from a positive voltage to a negative voltage.

The source driving circuit of the present invention can recycle charges when the voltages of the display signals provided by each of the output channels are changed from positive polarity to negative polarity, by controlling the on/off of the first switch element and the second switch element of each of the output channels. Therefore the most of the charges generated when the voltages of the display signals are change from positive polarity to negative polarity can be fully utilized. Furthermore, the charges recycled by the source driving circuit can be provided to a printed circuit board of the LCD device to utilize, so whole power consumption of the LCD device can be reduced.

The above description is only an overview of the technical solutions of the present invention, and in order to more clearly understand technical means of the present invention and then can be implemented in accordance with contents of the specification, and in order to make the aforementioned and other objectives, features and advantages be more comprehensible, preferred embodiments will be described below in detail with reference to accompanying drawings.

DETAILED DESCRIPTION OF PREFERRED EMBODIMENTS

In order to further illustrate the technical means adopted for achieving the intended purpose of the present invention and effects thereof, specific implementations, methods, processes and effects of a source driving circuit and an LCD device provided by the present invention will be described below in detail in preferred embodiments with reference to the accompanying drawings.

The foregoing and other related technical contents, features and effects of the present invention will be clearly described in detail below in the description of preferred embodiments with reference to accompanying drawings. By the illustration of specific embodiments, the technical means adopted for achieving the intended purpose and the effects thereof of the present invention can be comprehensively understood. However, the accompanying drawings are used for reference and description only, and not used to restrict the present invention.

Figures 1, 2:
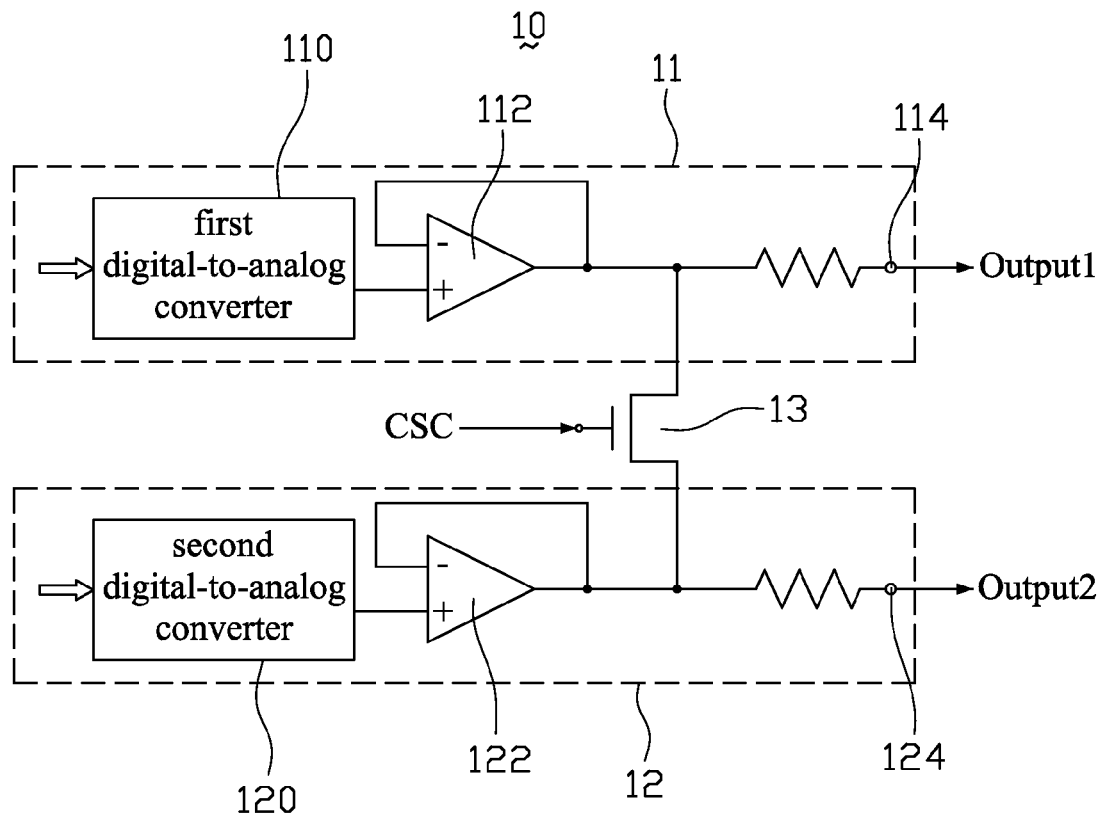
FIG. 1 is a schematic view of voltage polarity of dot inversion.
FIG. 2 is a schematic circuit diagram of a conventional source driving circuit.
Figure 3:
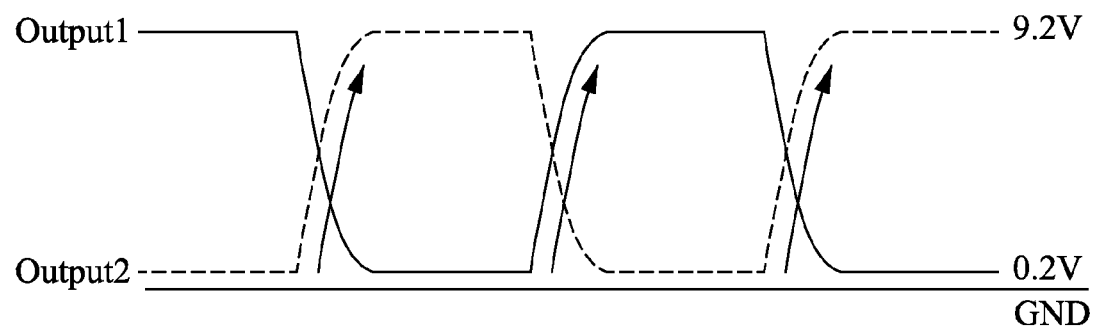
FIG. 3 is a schematic waveform diagram of a first output signal and a second output signal when the source driving circuit of FIG. 2 is not using charge sharing technology.
Figure 4:
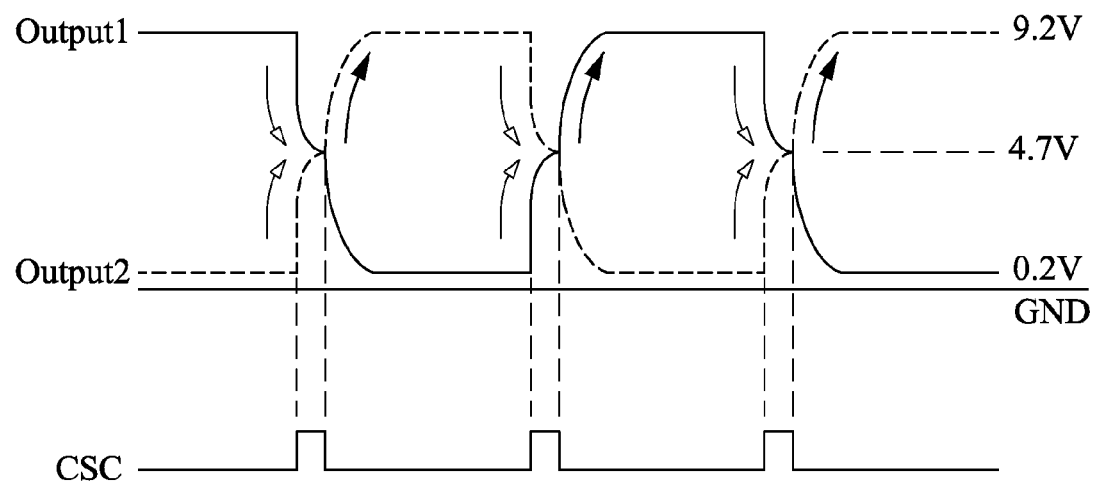
FIG. 4 is a schematic waveform diagram of a first output signal and a second output signal when the source driving circuit of FIG. 2 uses charge sharing technology.
Figure 5:
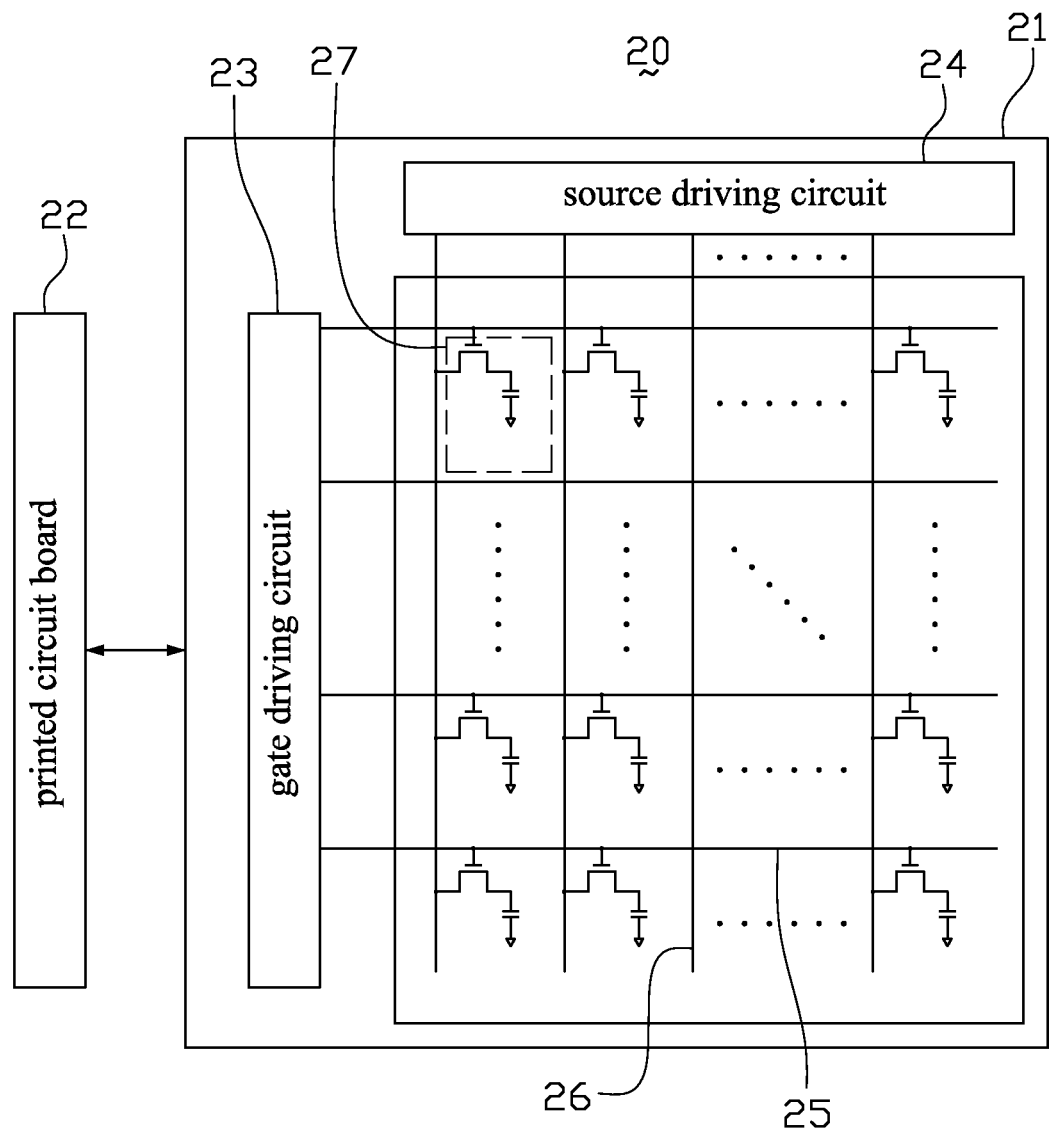
FIG. 5 is a schematic circuit diagram of an LCD device according to an embodiment of the present invention.

Please referring to FIG. 5, FIG. 5 is a schematic circuit diagram of an LCD device according to an embodiment of the present invention. As shown in FIG. 5, the LCD device 20 includes an LCD panel 21 and a printed circuit board 22. To provide power signals, timing control signals, image signals and so on, circuits such as a power circuit, a timing controller are disposed on the printed circuit board 22, and the printed circuit board 22 is connected to the LCD panel 21 through an FPC (Flexible Printed Circuit). The LCD panel 21 includes a gate driving circuit 23, a source driving circuit 24, a plurality of scanning lines 25, a plurality of data lines 26, and a plurality of pixels 27 formed by intersection of the plurality of scanning lines 25 and the plurality of data lines 26. The plurality of scanning lines is connected to the gate driving circuit 23. The gate driving circuit 23 is used to provide gate driving signals to the plurality of pixels 27 through the plurality of scanning lines 25. The plurality of data lines 26 is connected to the source driving circuit 24. The source driving circuit 24 is used to provide display signals to the plurality of the pixels 27 through the plurality of the data lines 26. In the embodiment, dot inversion driving manner is used in the LCD device 20.

Figure 6:
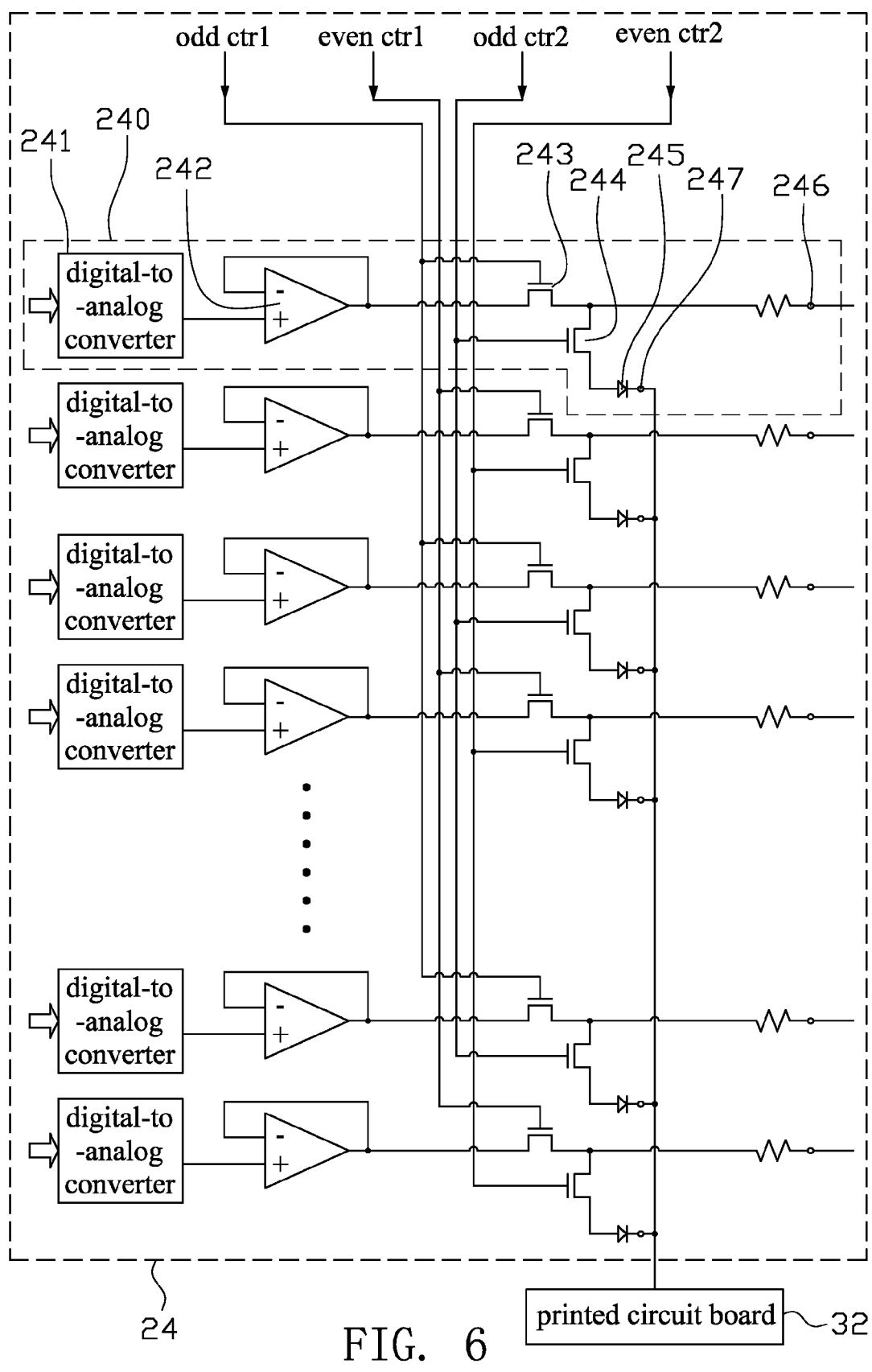
FIG. 6 is a schematic circuit diagram of a source driving circuit of the LCD device of FIG. 5.

Please referring also to FIG. 6, FIG. 6 is a schematic circuit diagram of the source driving circuit 24 of the LCD device 20 of FIG. 5. As shown in FIG. 6, the source driving circuit 24 includes a plurality of output channels 240, the plurality of output channels 240 is respectively connected to the plurality of data lines 26, to provide the display signals to the plurality of data lines 26 and to provide recycled charges to the circuits disposed on the printed circuit board 22. Each of the plurality of output channels 240 includes a digital-to-analog converter 241, an amplifier 242, a first switch element 243, a second switch element 244, a diode 245, a first output end 246, and a second output end 247. The first switch element 243 and the second switch element 244 may be transistors.

An input end of the digital-to-analog converter 241 is used to receive corresponding display data, and an output end of the digital-to-analog converter 241 is connected to a non-inverting input end of the amplifier 242, an inverting input end of the amplifier 242 is connected to an output end of the amplifier 242. The output end of the amplifier 242 is connected to a first conduction terminal of the first switch element 243. A second conduction terminal of the first switch element 243 is connected to the first output end 246. The first output end 246 is connected to a corresponding data line 26. When the first switch element 243 is turned on, the display signal is provided to the corresponding data line 26 through the digital-to-analog converter 241, the amplifier 242 and the first switch element 243.

A first conduction terminal of the second switch element 244 is connected to the second conduction terminal of the first switch element 243, a second conduction terminal of the second switch element 244 is connected to an anode of the diode 245. A cathode of the diode 245 is connected to the second output end 247, the second output end 247 is connected to the printed circuit board 22.

According to an arranged order, the plurality of the output channels 240 is divided into odd output channels 240 and even output channels 240. For example, a first output channel, a third output channel, a fifth output channel and other odd-numbered output channels are odd output channels 240, and the second output channel, the fourth output channel, the sixth output channel and other even-numbered output channels are even output channels 240. Control terminals of the first switch elements 243 of the odd output channels 240 are used to receive an odd first control signal odd ctr1. Control terminals of the second switch elements 244 of the odd output channels 240 are used to receive an odd second control signal odd ctr2. Control terminals of the first switch elements 243 of the even output channels 240 are used to receive an even first control signal even ctr1, control terminals of the second switch elements 244 of the even output channels 240 are used to receive an even second control signal even ctr2. Phase of the odd first control signal odd ctr1 and that of the odd second control signal odd ctr2 are opposite, phase of the even first control signal even ctr1 and that of the even second control signal even ctr2 are opposite.

In the embodiment, the first output channels 246 of the odd output channels 240 are respectively connected to odd-column data lines 26, and the first output channels 246 of the even output channels 240 are respectively connected to even-column data lines 26. Because the source driving circuit 24 uses the dot inversion driving manner, polarity of voltage of a display signal provided by an odd output channel 240 of adjacent two output channels 240 and polarity of voltage of a display signal provided by an even output channel 240 of the adjacent two output channels 240 is opposite with each other.

Figure 7:
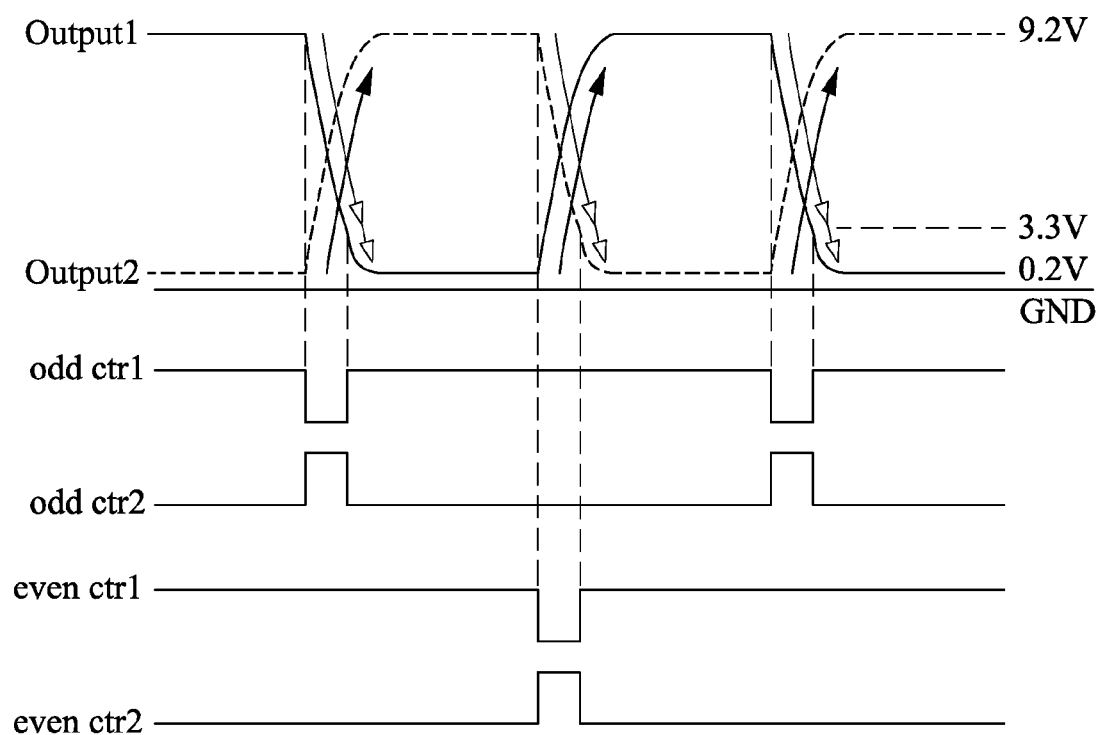
FIG. 7 is a schematic waveform diagram of part signals of the source driving circuit of FIG. 6.

Please referring to FIG. 7, FIG. 7 is a schematic waveform diagram of part signals of the source driving circuit 24. Taking using the dot invention driving manner, a reference voltage being 4.7V, and outputs of an odd output channel 240 and an even output channel 240 of the adjacent two output channels 240 being maximum display power consumption (such as a maximum negative voltage is 0.2V, and a maximum positive voltage is 9.2V) for example, it is noted that, the maximum display power consumption corresponds to a voltage corresponding to a maximum grayscale value, in actually display, the plurality of output channels 240 can provide the display signals having a plurality of voltages such as 0.1V, 0.9V, 8.5V and so on according to actually needed grayscale value.

As shown in FIG. 7, the first output ends 246 of the odd output channel 240 and the even output channel 240 of the adjacent two output channels 240 respectively output a first output signal Output1 and a second output signal Output2. Voltages of the first output signal Output1 and the second output signal Output2 change between 0.2V and 9.2V at a row scanning frequency. It is noted that, the row scanning frequency is related to frame frequency of the LCD device 20 and number of the scanning lines 25. For example, if the frame frequency of the LCD device 20 is 60 HZ, the number of the scanning lines 25 is 300, then the row scanning frequency is 60*300=18 kHZ. That is, when every scanning line 25 is scanned, polarities of the voltages of the first output signal Output1 and the second output signal Output2 are changed once, to make the display signals provided from each data line 26 to adjacent two pixels 27 in the same column have opposite voltage polarities. As indicated by solid arrows, the first output signal Output1 and the second output signal Output2 changing from 0.2V to 9.2V (from negative voltage to positive voltage) consumes current.

When the first output signal Output1 and the second output signal Output2 change from 9.2V to 0.2V (from positive voltage to negative voltage), the odd first control signal odd ctr1 and the even first control signal even ctr1 jump to low level, to respectively control the first switch elements 243 of the odd output channel 240 and the even output channel 240 of the adjacent two output channels 240 to be turned off. At the same time, the odd second control signal odd ctr2 and the even second control signal even ctr2 jump to high level, to respectively control the second switch elements 244 of the odd output channel 240 and the even output channel 240 of the adjacent two output channels 240 to be turned on, thus recycle charges generated when the voltages of the first output signal Output1 and the second output signal Output1 drop down are recycled, and are provided to corresponding circuits (such as a DC to DC converter) disposed on the printed circuit board 22 through the second output channels 247. What calls for attention is that, the circuit disposed on the printed circuit board 22 to receive the recycled charges from the source driving circuit 24 should have a maximum input voltage no less than the maximum positive voltage of the display signal, like 9.2V in the embodiment.

Under limitation of operating voltages of the second switch element 244, the diode 245 and the corresponding circuits disposed on the printed circuit board 22, the charges generated when the voltages of the first output signal Output1 and the second output signal Output2 drop down cannot be recycled entirely, therefore a lower bound of the recycled voltage exists, and charges generated when the voltages of the first output signal Output1 and the second output signal Output2 fall to the lower bound of the recycled voltage from high level can be recycled and utilized. For example, FIG. 7 shows the charges generated when the voltages of the first output signal Output1 and the second output signal Output2 fall to 3.3V from 9.2V are recycled and utilized (as indicated by double hollow arrows), the voltage of 3.3V is the lower bound of the recycled voltage.

In the embodiment, turned-off time of the second switch element 244 can be preset according to the lower bound of the recycled voltage, when the voltages of the first output signal Output1 and the second output signal Output2 fall to the lower bound of the recycled voltage, the odd second control signal odd ctr2 and the even second control signal even ctr2 jump to low level, to respectively control the second switch elements 244 of the odd output channel 240 and the even output channel 240 of the adjacent two output channels 240 to be turned off. At the same time, the odd first control signal odd ctr1 and the even first control signal even ctr1 jump to high level, to respectively control the first switch elements 243 of the odd output channel 240 and the even output channel 240 of the adjacent two output channels 240 to be turned on, so as to provide display signals to corresponding pixels through the first switch elements 243 when a corresponding scanning line is scanned.

Because when each of the scanning lines is scanned, the source driving circuit 24 needs to provide the display signals to the corresponding pixels, the odd first control signal odd ctr1 and the even first control signal even ctr1 should be high level to respectively control the first switch elements 243 of the odd output channel 240 and the even output channel 240 of the adjacent two output channels 240 to be turned on, then the source driving circuit 24 provides the display signals to corresponding data lines 26 through the first switch elements 243 and the first output channels 246. At the same time, the odd second control signal odd ctr2 and the even second control signal even ctr2 should be low level, to respectively control the second switch elements 244 of the odd output channel 240 and the even output channel 240 of the adjacent two output channels 240 to be turned off.

In the embodiment, when the odd first control signal odd ctr1, the even first control signal even ctr1, the odd second control signal odd ctr2 and the even second control signal even ctr2 are high level, the first switch elements 243 and the second switch elements 244 are turned on, and when the odd first control signal odd ctr1, the even first control signal even ctr1, the odd second control signal odd ctr2 and the even second control signal even ctr2 are low level, the first switch elements 243 and the second switch elements 244 are turned off. In another embodiment, according to types of the first switch elements 243 and the second switch elements 244, it is can also be that, when the odd first control signal odd ctr1, the even first control signal even ctr1, the odd second control signal odd ctr2 and the even second control signal even ctr2 are low level, the first switch elements 243 and the second switch elements 244 are turned on, and when the odd first control signal odd ctr1, the even first control signal even ctr1, the odd second control signal odd ctr2 and the even second control signal even ctr2 are high level, the first switch elements 243 and the second switch elements 244 are turned off.

Because each of the output channels 240 of the source driving circuit 24 adds the first switch element 243, the second switch element 244, the diode 245 and the second output channel 247, by controlling the On/Off of the first switch elements 243 and the second switch elements 244, the charges generated when the display signal provided by each of output channels 240 changes from positive voltage to negative voltage are recycled, so as to make the most of the charges generated when the display signals change from positive voltage to negative voltage be utilized. Furthermore, the charges recycled from the source driving circuit 24 can be provided to the printed circuit board 22 of the LCD device 20 to utilize, so whole power consumption of the LCD device 20 is reduced.

Figure 8:
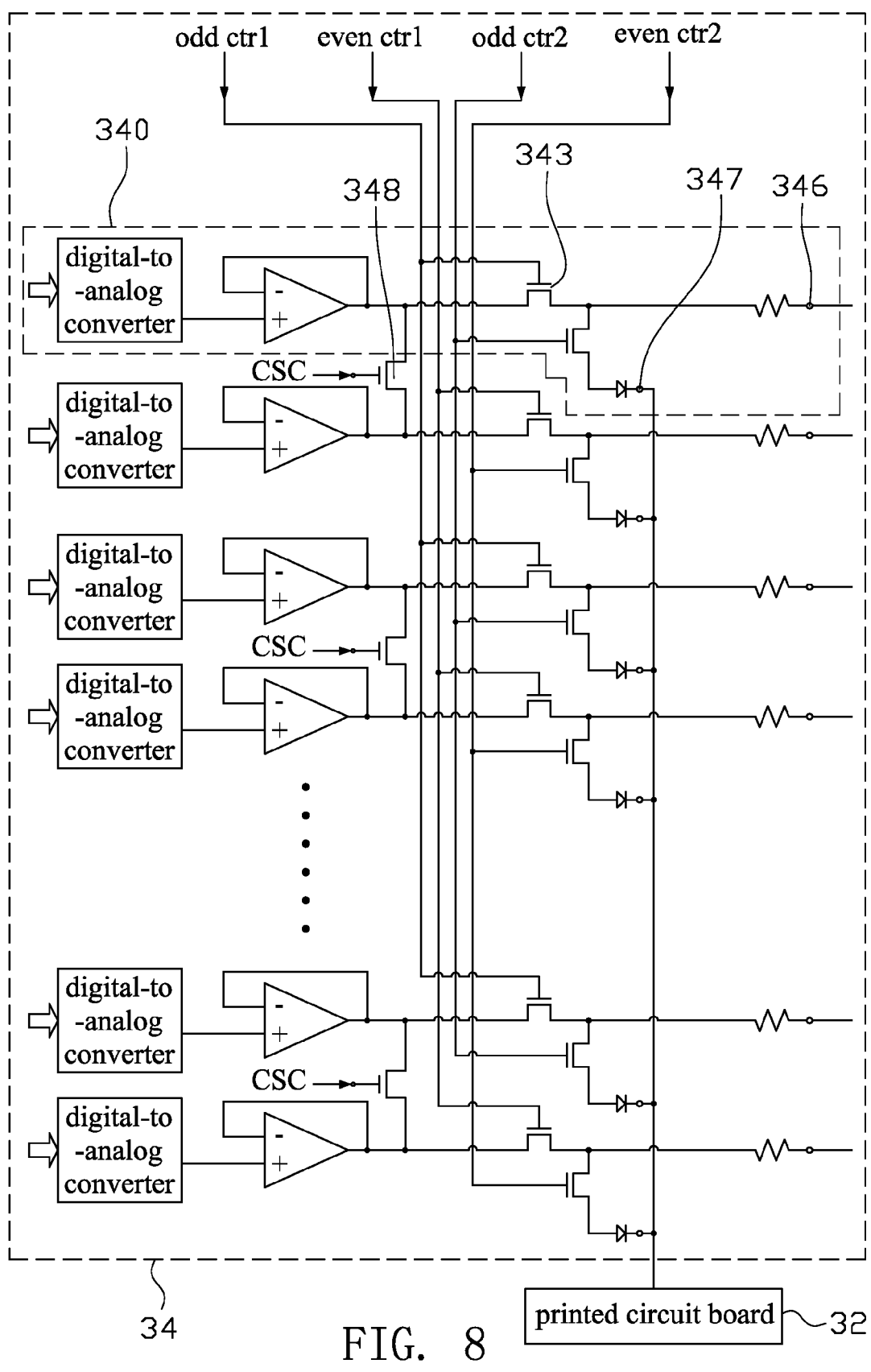
FIG. 8 is a schematic circuit diagram of a source driving circuit of an LCD device according to another embodiment of the present invention.

Please referring to FIG. 8, FIG. 8 is a schematic circuit diagram of a source driving circuit of an LCD device according to another embodiment of the present invention. As shown in FIG. 8, the source driving circuit 34 is similar to the source driving circuit 24, main difference between the source driving circuit 34 and the source driving circuit 24 is that, a first output end 346 of each of odd output channels 340 of the source driving circuit 34 is connected to a first output end 346 of an adjacent even output channel 340 through a third switch element 348, and the third switch element 348 is controlled by a charge sharing control signal CSC. The third switch element 348 may be transistor.

In the embodiment, a first conduction terminal of the third switch element 348 is connected to a first conduction terminal of a first switch element 343 of the odd output channel 240, a second conduction terminal of the third switch element 348 is connected to the first conduction terminal of the first switch element 343 of the even output channel 340, a control terminal of the third switch element 348 is used to receive the charge sharing control signal CSC. After the source driving circuit 34 drives a load, that is, when every scanning line is scanned, after the display driving circuit 34 provides display signals to the corresponding pixels and polarity of voltage provided by every output channel 340 starts to change, the charge sharing control signal CSC controls the third switch elements 348 of the source driving circuit 34 to be turned on, to make the first output ends 346 of the odd output channels 340 and the even output channels 340 of each pair of adjacent two output channels 340 share charges.

Figure 9:
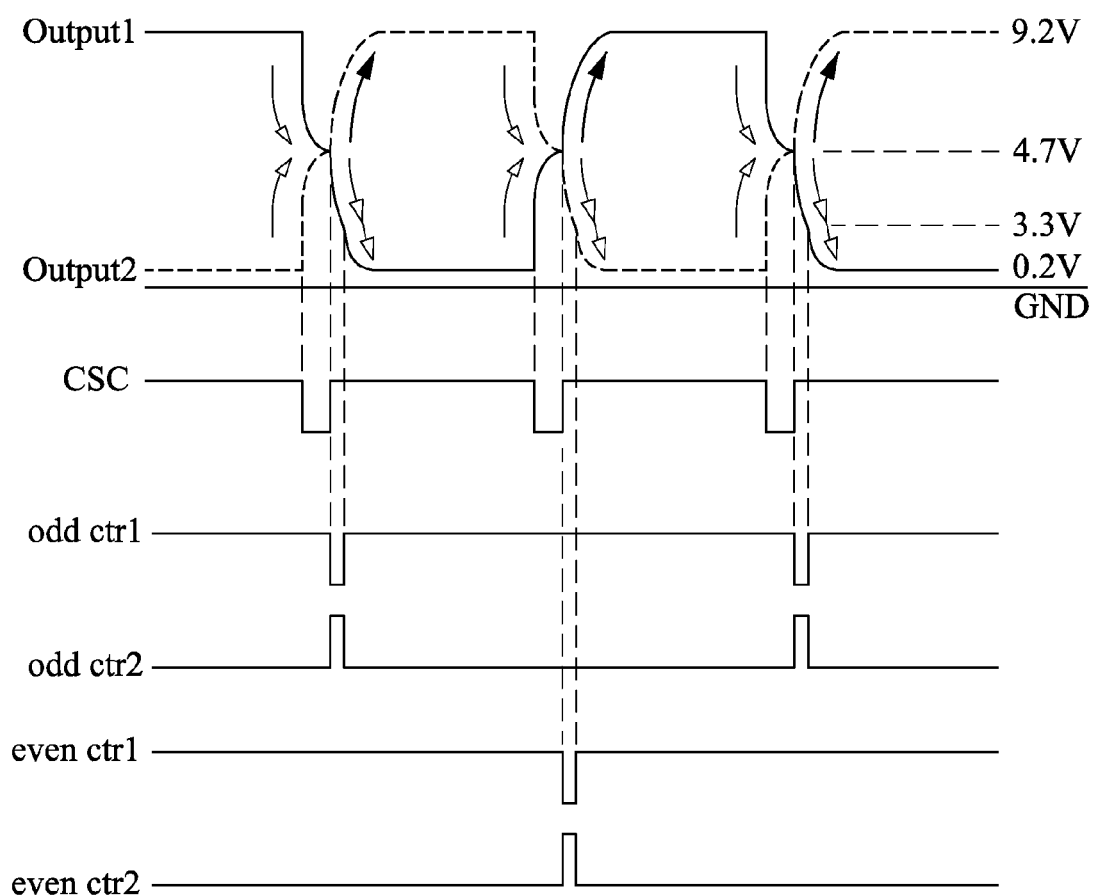
FIG. 9 is a schematic waveform diagram of part signals of the source driving circuit of FIG. 8.

Please referring to FIG. 9, FIG. 9 is a schematic waveform diagram of part signals of the source driving circuit 34. Taking using the dot invention driving manner, a reference voltage being 4.7V, and outputs of an odd output channel 340 and an even output channel 340 of the adjacent two output channels 340 with a maximum display power consumption (such as a maximum negative voltage is 0.2V, and a maximum positive voltage is 9.2V) for example, as shown in FIG. 9, when voltages of the first output signal Output1 and the second output signal Output2 respectively provided by the first output end 346 of the even output channels 340 and the first output end 346 of the adjacent odd output channels 340 is 9.2V and 0.2V, and when the polarities of the voltages provided by the odd output channel 340 and the even output channel 340 start to change, the charge sharing control signal CSC controls the third switch element 348 to be turned on, to make the odd output channel 340 and the even output channel 340 of the adjacent two output channels 340 share charges (as indicated by hollow arrows). After sharing the charges, the voltages of the first output end 346 of the odd output channel 340 and the adjacent even output channel 340 both change to 4.7V.

After that, the charge sharing control signal CSC controls the third switch element 348 to be turned off, when the first output signal Output1 provided by the odd output channel 340 and the second output signal Output2 provided by the even output channel 340 change, for example, when the second output signal Output2 provided by the even output channel 340 needs to change to 9.2V, the first output end 346 of the even output channel 340 has 4.7V voltage by having shared the charges. Therefore the voltage provided by the even output channel 340 just needs to change from 4.7V to 9.2V to provide the second output signal Output2 with 9.2V voltage, and just need to consume current when the voltage changes from 4.7V to 9.2V (as indicated by solid arrows).

Furthermore, when the voltage of the first output signal Output1 provided by the odd output channel 340 changes to negative voltage such as 0.2V, due to having shared the charges, the first output end 346 of the odd output channel 340 has 4.7V voltage, therefore the voltage of the first output signal Output1 provided by the odd output channel 340 falls from 4.7V. Meanwhile, the odd first control signal odd ctr1 jumps to low level to control the first switch element 343 of the odd output channel 340 to be turned off, and the odd second control signal odd ctr2 jumps to high level to control a second switch element 344 of the odd output channel 340 to be turned on, to make the charges generated when the voltage of the first output signal Output1 fall to a lower bound of a recycled voltage be recycled (as indicated by double hollow arrows), and to provide the recycled charges to corresponding circuits such as a DC-to-DC converter and so on disposed on a printed circuit board 32 of the LCD device through a second output end 347 of the odd output channel 340. It is noted that, a maximum input voltage of the circuit disposed on the printed circuit board 32 and used to receive the charges recycled by the source driving circuit 34 is not less than the reference voltage or the voltage obtained after the maximum positive voltage of the display signal shares charges with the maximum negative voltage, such as 4.7V of the embodiment.

When the voltage of the first output signal Output1 provided by the odd output channel 340 falls to the lower bound of the recycled voltage, the odd second control signal odd ctr2 jumps to low level to control the second switch element 344 of the odd output channel 340 to be turned off. At the same time, the odd first control signal odd ctr1 jumps to high level to control the first switch element 343 of the odd output channel 340 to be turned on, to provide the display signal to the corresponding pixel through the first switch element 343 when the corresponding scanning line of the LCD device is scanned.

Due to the source driving circuit 34 adding the third switch elements 348, and turning the third switch elements 348 on at a specific time to make the first output end 346 of each odd output channel 340 and the adjacent even output channel 340 share the charges, therefore the power consumption for voltages of output signals provided by each of the output channels 340 changing from negative voltage to positive voltage reduces, so more power consumption can be reduced than the source driving circuit 24.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A source driving circuit, comprising a plurality of output channels, wherein the plurality of the output channels are divided into odd output channels and even output channels alternately arranged with each other, each output channel comprises a first switch element, a second switch element, a first output end, and a second output end, the first switch element is connected to the first output end, the second switch element is connected to the second output end, the first switch element of each odd output channel is controlled by an odd first control signal, the second switch element of each odd output channel is controlled by an odd second control signal, the first switch element of each even output channel is controlled by an even first control signal, and the second switch element of each even output channel is controlled by an even second control signal, when the first switch element is turned on, the output channel outputs a display signal through the first switch element and the first output end, and when the second switch element is turned on, the output channel provides recycled charges through the second switch element and the second output end, and the recycled charges are generated when the display signal outputted by the first output end is changed from a positive voltage to a negative voltage; wherein each of the first switch element and the second switch element includes a first conduction terminal, a second conduction terminal, and a control terminal, the first conduction terminal of the first switch element is used to receive display data, the second conduction terminal of the first switch element is connected to the first output end, the first conduction terminal of the second switch element is connected to the second conduction terminal of the first switch element, the second conduction terminal of the second switch element is connected to the second output end, the control terminal of the first switch element of each odd output channel is connected to the odd first control signal, the control terminal of the second switch element of each odd output channel is connected to the odd second control signal, the control terminal of the first switch element of each even output channel is connected to the even first control signal, and the control terminal of the second switch element of each even output channel is connected to the even second control signal; wherein phase of the odd first control signal and phase of the odd second control signal are opposite, and phase of the even first control signal and phase of the even second control signal are opposite.

2. The source driving circuit according to claim 1, wherein each output channel further comprises a diode, an anode of the diode is connected to the second switch element of the output channel and a cathode of the diode is connected to the second output end of the output channel.

3. The source driving circuit according to claim 1, wherein each output channel further comprises a digital-to-analog converter and an amplifier, an input end of the digital-to-analog converter receives display data, an output end of the digital-to-analog converter is connected to a non-inverting input end of the amplifier, an inverting input end of the amplifier is connected to an output end of the amplifier, the output end of the amplifier is connected to the first conduction terminal of the first switch element of the output channel.

4. The source driving circuit according to claim 1, wherein each odd output channel is connected to an adjacent even output channel through a third switch element, the third switch element is controlled by a charge sharing control signal, after the source driving circuit drives a load, and polarity of voltage provided by each output channel starts to change, the charge sharing control signal controls the third switch element to be turned on, to make every pair of adjacent odd output channel and even output channel share charges.

5. The source driving circuit according to claim 4, wherein a first conduction terminal of the third switch element is connected to the first conduction terminal of the first switch element of the odd output channel, a second conduction terminal of the third switch element is connected to the first conduction terminal of the first switch element of the adjacent even output channel, and a control terminal of the third switch element receives the charge sharing control signal.

6. An LCD (liquid crystal display) device, comprising a source driving circuit and a plurality of data lines, the source driving circuit comprising a plurality of output channels, the plurality of the output channels being respectively connected to the plurality of the data lines to provide display signals to the plurality of the data lines, wherein the plurality of the output channels are divided into odd output channels and even output channels alternately arranged with each other, each output channel comprises a first switch element, a second switch element, a first output end, and a second output end, the first switch element is connected to the first output end, the second switch element is connected to the second output end, the first switch element of each odd output channel is controlled by an odd first control signal, the second switch element of each odd output channel is controlled by an odd second control signal, the first switch element of each even output channel is controlled by an even first control signal, and the second switch element of each even output channel is controlled by an even second control signal, when the first switch element is turned on, the output channel outputs a display signal through the first switch element and the first output end to a corresponding data line, and when the second switch element is turned on, the output channel provides recycled charges through the second switch element and the second output end, and the recycled charges are generated when the display signal outputted by the first output end is changed from a positive voltage to a negative voltage; wherein each of the first switch element and the second switch element includes a first conduction terminal, a second conduction terminal, and a control terminal, the first conduction terminal of the first switch element is used to receive display data, the second conduction terminal of the first switch element is connected to the first output end, the first conduction terminal of the second switch element is connected to the second conduction terminal of the first switch element, the second conduction terminal of the second switch element is connected to the second output end, the control terminal of the first switch element of each odd output channel is connected to the odd first control signal, the control terminal of the second switch element of each odd output channel is connected to the odd second control signal, the control terminal of the first switch element of each even output channel is connected to the even first control signal, and the control terminal of the second switch element of each even output channel is connected to the even second control signal; wherein phase of the odd first control signal and phase of the odd second control signal are opposite, and phase of the even first control signal and phase of the even second control signal are opposite.

7. The LCD device of claim 6, wherein the LCD device further comprises a printed circuit board, the second output end of each output channel is connected to the printed circuit board, to provide the recycled charges to the printed circuit board.

8. The LCD device of claim 6, wherein the LCD device uses a dot inversion driving manner.

9. The LCD device of claim 6, wherein each output channel further comprises a diode, an anode of the diode is connected to the second switch element of the output channel and a cathode of the diode is connected to the second output end of the output channel.

10. The LCD device of claim 6, wherein each output channel further comprises a digital-to-analog converter and an amplifier, an input end of the digital-to-analog converter receives display data, an output end of the digital-to-analog converter is connected to a non-inverting input end of the amplifier, an inverting input end of the amplifier is connected to an output end of the amplifier, the output end of the amplifier is connected to the first conduction terminal of the first switch element of the output channel.

11. The LCD device of claim 6, wherein each odd output channel is connected to an adjacent even output channel through a third switch element, the third switch element is controlled by a charge sharing control signal, after the source driving circuit drives a load, and polarity of voltage provided by each output channel starts to change, the charge sharing control signal controls the third switch element to be turned on, to make every pair of adjacent odd output channel and even output channel share charges.

12. The LCD device of claim 11, wherein a first conduction terminal of the third switch element is connected to the first conduction terminal of the first switch element of the odd output channel, a second conduction terminal of the third switch element is connected to the first conduction terminal of the first switch element of the adjacent even output channel, and a control terminal of the third switch element receives the charge sharing control signal.

* * * * *